United States Patent Office 3,069,973
Patented Dec. 25, 1962

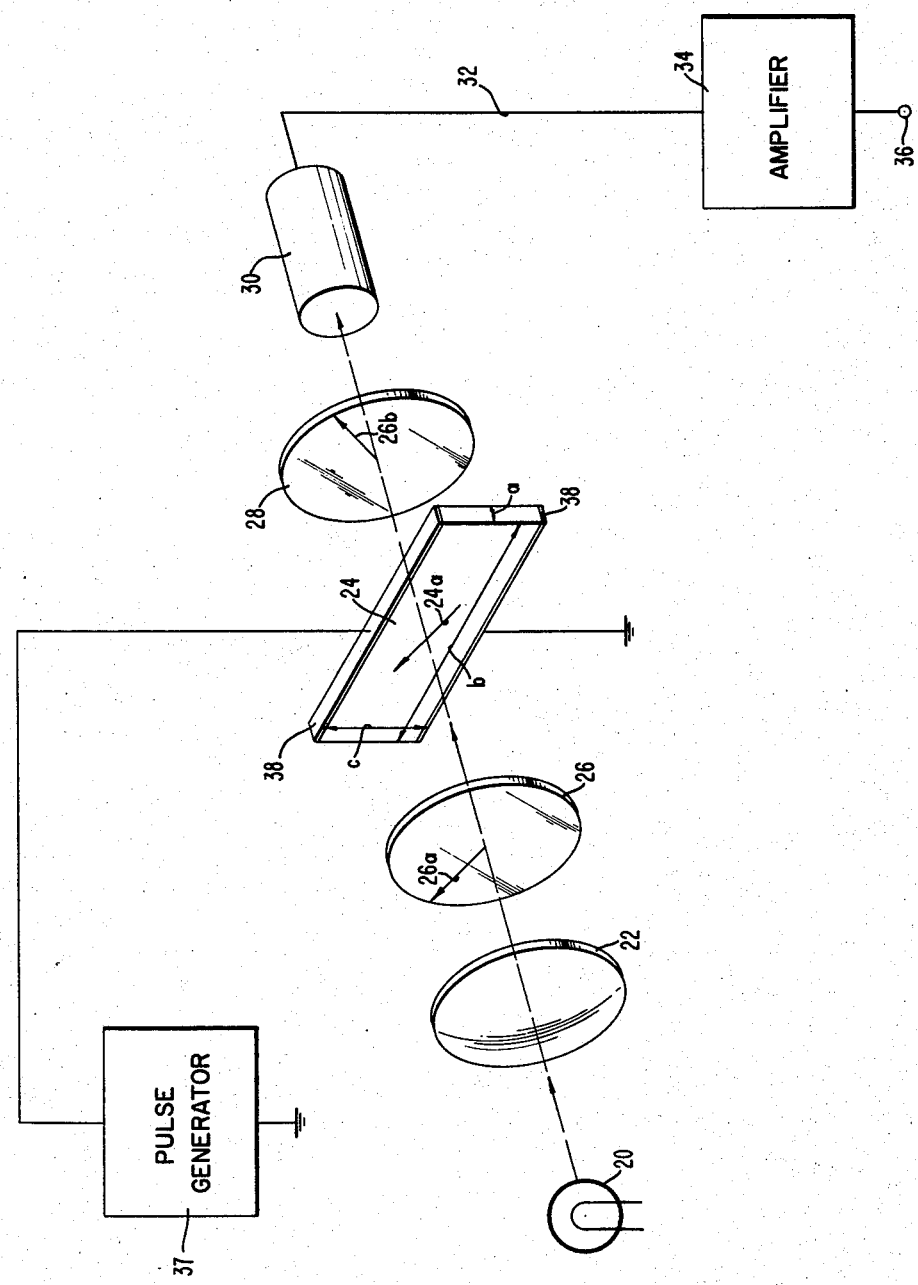

3,069,973
ELECTRO-OPTIC LIGHT SWITCH
Irving Ames, Peekskill, N.Y., assignor to International Business Machines Corporation, New York, N.Y., a corporation of New York
Filed Dec. 14, 1959, Ser. No. 859,334
11 Claims. (Cl. 88—61)

The present invention relates to electro-optics and, more particularly, to an improved electrically controlled light modulating device.

Light modulators which use electrically controllable birefringent light switching elements are well known in the art. These devices have been fabricated by placing the controllable birefringent element between two crossed polarizers, that is, polarizers having their planes of polarization at right angles to each other. The light input is passed through the first polarizer and is applied in the form of plane polarized light to the light switching elements. If this element is of the type that exhibits birefringent properties only in the presence of an electrical field, the plane polarized light passes through the material of the element without rotation and is totally absorbed by the second polarizer. When, however, an electrical field is applied to the element in such a way as to cause it to exhibit birefringent characteristics, the incident light emerges from the element as elliptically polarized light. This elliptically polarized light is not totally absorbed by the second polarizer and a portion of it passes through this polarizer. An output device which may, for example, be a photomultiplier is placed on the other side of the second polarizer to produce output signals for the switch in response to light which passes through the second polarizer. An example of a switching element of this type using a material which is birefringent only when subjected to an electrical field is the barium titanate light switch which is operated at a temperature above the Curie point (120° C.), for the barium titanate, at which temperature the barium titanate is no longer ferroelectric. A complete description of barium titanate light switches of this type, as well as circuits using these switches is found in copending application Serial No. 645,995, filed March 14, 1957, in behalf of A. C. Koelsch et al., now U.S. Patent No. 3,027,806, and assigned to the assignee of the subject invention. The advantages of this high temperature barium titanate light switch are that it is operable in response to much smaller voltages and at much higher speeds than other light switches known in the art.

Light switches have also been fabricated using materials which are birefringent even in the absence of an electrical field. In a light switch or modulator of this type, modulation of the light is made possible by the fact that the amount of birefringence exhibited by the material and, therefore, the amount by which the polarization of the light is changed as it is passed through the material, may be varied by applying varying electrical fields to the body. Electro-optical devices of this type are exemplified by those fabricated with a body of ferroelectric material as the birefringent element. Ferroelectric materials are characterized in that they retain a large degree of electric polarization even in the absence of an electric field. The direction of this retained polarization or remanent polarization as it is better known, is termed the polar axis for the material. This polar axis is parallel to the optic axis of the ferroelectric material. In the past, ferroelectric light modulators of this type have been operated by applying incident light at an acute angle, usually 45°, to the polar axis and applying the electrical field to the crystal in a direction parallel to this axis. One such ferroelectric light modulator is shown and described in Patent No. 2,691,738, issued October 12, 1954, to B. T. Matthias. Though devices constructed in this way are operable at room temperature and have many useful applications, they require the use of relatively large voltages and are limited in their speed of response.

In accordance with the principles of the present invention, an electro-optical light switch is provided which is operable at room temperature, which is controllable by relatively small voltages and is operable at high speeds. This switch uses as a light switching element a single crystal of ferroelectric material, illustratively shown as barium titanate, which is ferroelectric at room temperature. The electrodes for applying the electrical field to the barium titanate crystal are arranged at an acute angle to the direction of remanent polarization in the crystal. The pair of crossed polarizers used in the switch are arranged so that the plane of polarization of one of these polarizers is parallel to the direction of remanent polarization in the crystal. This direction is termed the crystal's polar axis and is parallel to the crystal's optical axis. More specifically, in the illustrative embodiment herein disclosed, the plane of polarization of the first polarizer, which separates the crystal from the input light source, is parallel to the polar axis of the crystal. When, in the absence of an electrical field, light passing through this polarizer is applied in the form of plane polarized light to the ferroelectric light switching element, all of the incident light propagates through the material parallel to the polar axis of the crystal. Since there is no component of the light input propagating in a plane perpendicular to the crystal's polar axis, the light passes through the material with no change in polarization and is totally absorbed in the second polarizer. When a voltage is applied to the electrodes which, as stated above, are arranged so that they provide an electric field at an acute angle to the direction of electrical polarization in the crystal, it has been found that the light passing through the crystal emerges elliptically polarized. As a result, the light incident on the second polarizer is not totally absorbed and a portion of this light is passed through this polarizer and is detected by a light responsive output device. Further, significant light outputs are produced in response to relatively small applied voltages.

It is, therefore, an object of the present invention to provide an improved light switch.

It is a further object to provide a light switch which can be operated by relatively small voltages.

It is still another object to provide a low voltage light switch which is operable at room temperature.

A further object is to provide an improved electro-optical light switch using as a controllable birefringent element a body of ferroelectric material maintained at a temperature at which it is ferroelectric.

Still another object is to provide a light switch of the above type using a pair of crossed polarizers wherein the plane of polarization of the polarizers, the direction of remanent polarization in the ferroelectric, and the direction of the applied electric control field are such that On-Off type light switching is achieved.

The foregoing and other objects, features and advantages of the invention will be apparent from the following more particular description of the preferred embodiment of the invention, as illustrated in the accompanying drawing, wherein a single FIGURE provides a partly diagrammatic representation of a light switch constructed in accordance with the principles of applicant's invention.

The light input to the light switch of this figure is supplied by a mercury arc lamp 20 and is focused by a lens 22. The birefringent element, in the form of a single crystal of barium titanate in a ferroelectric state, is represented at 24 and this crystal is mounted between a pair of polarizers 26 and 28. The planes of polarization of these polarizers are shown by the arrows 26a and 26b. These planes are at right angles to each other so that light passing through both polarizers successively without being disturbed is totally absorbed. The output for the light switch shown is provided by a photomultiplier 30 which is responsive to detect light passing through polarizer 28. This photomultiplier, in response to this light, produces an output on line 32 which is fed as an input to amplifier 34. Amplifier 34 produces an amplified output at terminal 36. The light switch is controlled by a pulse generator 37 which is connected to one of a pair of electrodes 38 mounted on the ferroelectric crystal 24. The other electrode 38 is connected to ground.

Arrow 24a on the body of the ferroelectric crystal 24 represents the polar axis of this crystal, that is, the axis of preferred orientation along which the ferroelectric domains in the crystal are remanently orientated. As can be seen, this direction of remanent polarization in the crystal is essentialy at 45° to the electrodes 38 on the crystal. When a signal is applied by pulse generator 37 to these electrodes, the resulting electric field in the crystal is at 45° to the direction of remanent polarization in the crystal.

The barium titanate crystal 24 is normally birefringent in the absence of an electric field in that if a light input is applied to the crystal which has a component both parallel to the polar axis, as represented by arrows 24a, and a component at right angles to the direction of this arrow, these components propagate at different speeds as they pass through the crystal and, therefore, the light emerges as elliptically polarized light. However, the switching device shown in the figure of the drawing is not operated in this way. In the absence of a signal from pulse generator 37, applied to electrodes 38, light is passed through the crystal 24 without a change in its polarization. This is due to the fact that the plane of polarization of polarizer 26 is parallel to the direction of remanent polarization in the ferroelectric crystal which direction is parallel to the optical axis in the crystal. Therefore, when light is passed through polarizer 26 and is applied in the form of plane polarized light to the crystal 24, with the plane of polarization of this light being parallel to the polar axis of the barium titanate crystal as represented by the arrow 24a, the light is passed through the crystal with no change in its polarization and is totally absorbed by the second polarizer 28. However, if the pulse generator 37 is actuated to cause an electric field to be applied across the crystal at an acute angle to the direction of remanent polarization in the crystal, which angle is 45° in the illustrative embodiment, the plane polarized light incident on the crystal emerges elliptically polarized and is not totally absorbed by the second polarizer 28. A portion of this light passes through this polarizer and is detected by the photomultiplier 30, causing a signal to be produced on line 32 and applied to amplifier 34. This amplifier, in turn, produces an amplified output signal at terminal 36.

Light switches of the type shown using ferroelectric crystals having dimensions of 0.1 millimeter, by 5 millimeters, by 1 millimeter, in the directions indicated in the figure of the drawing, by the arrows a, b, and c, respectively, have been successfully operated with the polar axis of the crystal at angles from a few degrees to 45° to the electroded sides of the crystal. Light switching from an off to an on condition has been achieved using applied fields of about 1 kilovolt per centimeter. Though it cannot be stated with certainty, at this time, exactly what causes the rotation of the light in response to the applied electric field, it is felt that the field is effective to rotate many of the individual ferroelectric domains in the crystal so that the plane of polarization of the incident light is no longer parallel to this axis. As a result, the incident light includes components both parallel to and perpendicular to the crystal's polar axis and is, therefore, rotated as it passes through the crystal.

While the invention has been shown and described with reference to a preferred embodiment thereof, it will be understood by those skilled in the art that various changes in form and details may be made therein without departing from the spirit and scope of the invention.

What is claimed is:

1. In an electro-optical device of the type wherein a light modulating element is mounted between first and second polarizers with said first polarizer being mounted between said element and a light source; said light modulating element comprising a body of ferroelectric material having a polar axis of remanent electric polarization, the polar axis of said body of ferroelectric material being parallel to the plane of polarization of one of said polarizers and perpendicular to the plane of polarization of the other of said polarizers; whereby light from said source passing through said first polarizer and incident on said body of ferroelectric material normally passes through said body and is absorbed by said second polarizer; and means for producing in said body of ferroelectric material an electric field at an acute angle to the polar axis thereof to cause the polarization of the light passing through said body to be changed so that at least a portion of the light emerging from said body passes through said second polarizer.

2. The device of claim 1 wherein said body of ferroelectric material is a single crystal of barium titanate.

3. The device of claim 1 wherein the acute angle between the polar axis of said ferroelectric crystal and the electric field produced therein is sustantially 45°.

4. In an electro-optical device of the type wherein a light modulating element is mounted between first and second crossed polarizers; said light modulating element comprising a body of ferroelectric material having a polar axis of remanent electrical polarization; said first polarizer having a plane of polarization parallel to said polar axis of said body of ferroelectric material; and a pair of electrodes mounted on said body effective when a voltage is applied therebetween to produce in said body an electric field at an acute angle to the polar axis in said body.

5. The device of claim 4 wherein said body of ferroelectric material comprises single crystal barium titanate and the angle between the polar axis of said body and the electric field therein is substantially 45°.

6. In an electro-optical device of the type wherein a light modulating element is mounted between first and second crossed polarizers with said first polarizer being mounted between said element and a light source and said second polarizer being mounted between said element and light responsive means; said light modulating element comprising a crystal of barium titanate having first and second electrodes; said crystal of barium titanate being in a ferroelectric state and having a polar axis of remanent polarization at an angle of substantially 45° to said electrodes; and means for applying voltage signals to said electrodes of said ferroelectric crystal.

7. The device of claim 6 wherein said first and second cross polarizers are mounted with the plane of polarization of one of the polarizers parallel to the polar axis of remanent polarization in said crystal of barium titanate.

8. The device of claim 6 wherein said first polarizer is mounted with its plane of polarization parallel to the polar axis of remanent polarization in said crystal of barium titanate.

9. In an electro-optical device, an element having an optic axis and controllable birefringent properties, said element comprising a single crystal of barium titanate in a ferroelectric state having a polar axis of remanent polarization parallel to said optic axis, first and second polarizers having first and second planes of polarization, respectively, light input means, said element being mounted between said first and second polarizers with its optic axis parallel to the plane of polarization of one of said polarizers, said first polarizer separating said element from said light input means, light responsive output means, said second polarizer separating said element from said light responsive output means and means for controlling the birefringent properties of said element comprising means for producing in said crystal of barium titanate an electric field at an angle of substantially 45° to the polar axis of remanent polarization in said crystal to thereby control the transmission of light through said device.

10. In an electro-optical device, an element having an optic axis and controllable birefringent properties, a polarizer having a plane of polarization, a source of light, said polarizer being mounted between source of light and said element with its plane of polarization parallel to the optic axis of said element and means for controlling the birefringent properties of said element comprising means for producing in said element an electric field at an acute angle to the optic axis of said element to thereby control the polarization of light form said source emerging from said element.

11. An electro-optical device comprising an element having an optic axis and controllable birefringent properties, a polarizer having a given plane of polarization, a source of light, said polarizer being disposed between said source of light and said element with its plane of polarization parallel to the optic axis of said element, and control means including means for producing in said element an electric field at an acute angle within the range from a few degrees to 45 degrees to the optic axis of said element for controlling the birefringent properties of said element to thereby control the polarization of light from said source emerging form said element.

References Cited in the file of this patent
UNITED STATES PATENTS

| | | |
|---|---|---|
| 2,024,737 | Klingsporn | Dec. 17, 1935 |
| 2,597,589 | Matthias | May 20, 1952 |
| 2,691,738 | Matthias | Oct. 12, 1954 |
| 2,928,075 | Anderson | Mar. 8, 1960 |
| 2,936,380 | Anderson | May 10, 1960 |